Nov. 27, 1956 C. H. WILLSEY 2,771,926
EGG CRACKING MECHANISM
Filed Aug. 25, 1953 3 Sheets-Sheet 1
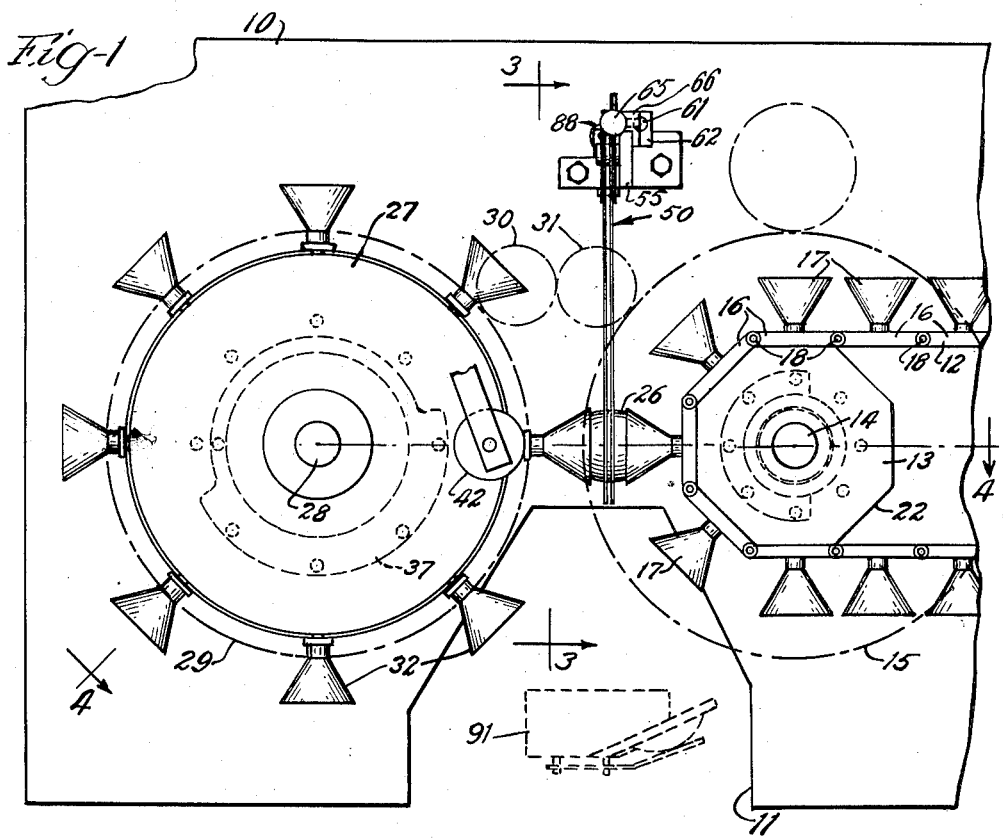
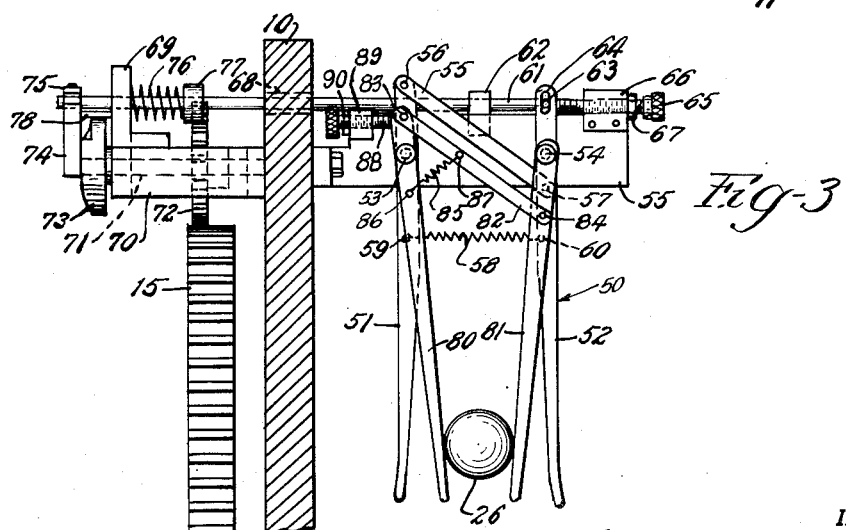
INVENTOR.
Charles H. Willsey
BY
Cromwell, Greist & Warden
Attys.

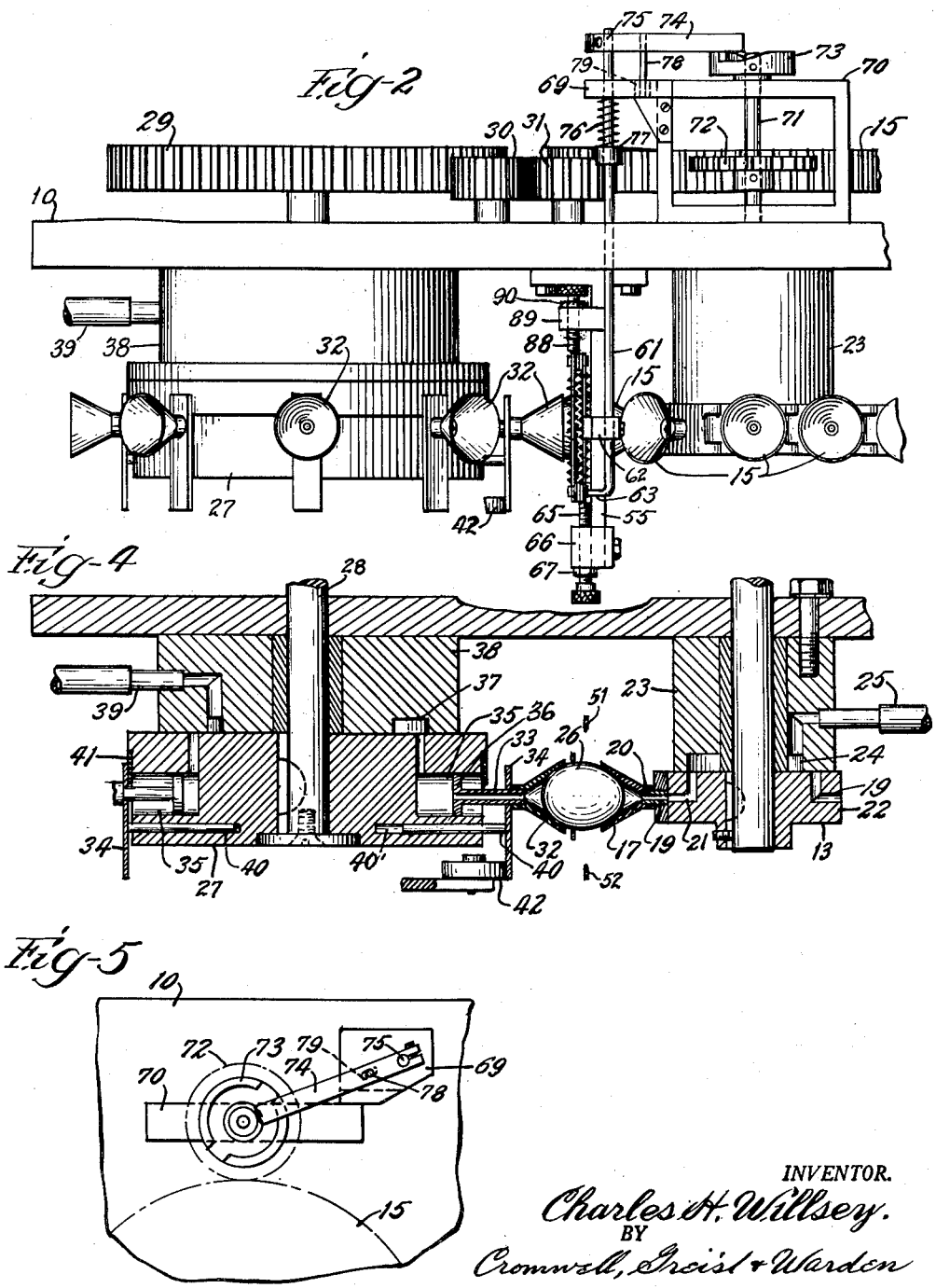

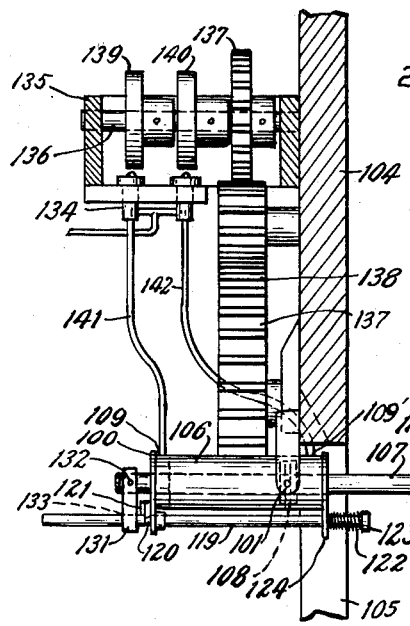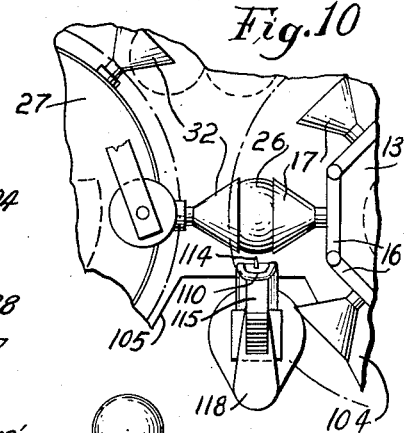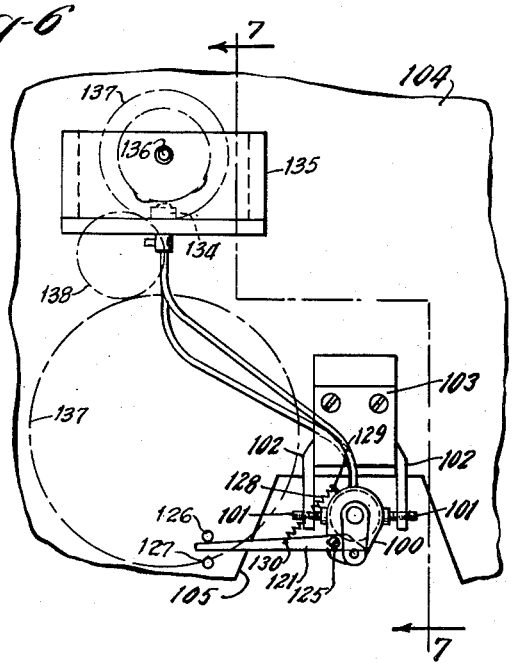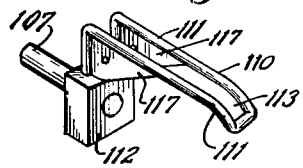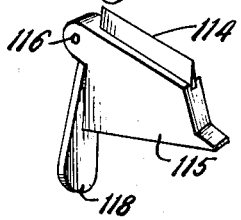

United States Patent Office 2,771,926
Patented Nov. 27, 1956

2,771,926

EGG CRACKING MECHANISM

Charles H. Willsey, Topeka, Kans.

Application August 25, 1953, Serial No. 376,417

13 Claims. (Cl. 146—2)

This invention relates to egg handling apparatus and is more particularly concerned with improvements in a machine having mechanism for cracking or breaking successive eggs and separating the broken shell portions to deliver the contents to cooperating mechanism for separating the yolks from the whites.

In the mechanisms which have heretofore been proposed for cracking or breaking eggs, separating the broken or cracked shell into portions, and delivering the contents from the separated shell portions to cooperating mechanism for separating the yolks and the whites, difficulty has been encountered in providing a satisfactory arrangement for cracking the successive eggs in an efficient manner. Due to the wire variation in the size and shape of the eggs, it is necessary to provide a mechanism which is so constructed that it will operate to crack each successive egg regardless of its size or shape.

It is a general object of the present invention to provide an improved egg handling machine having mechanism for advancing successive eggs to a cracking station, mechanism for gripping the eggs at opposite ends at the cracking station and mechanism for automatically cracking or breaking the shells of the successive eggs, regardless of their size or shape, to permit delivery of the contents thereof from the broken shell.

It is a more specific object of the invention to provide a machine wherein a plurality of eggs are delivered on end to a holding or supporting conveyor, the individual eggs are advanced along a predetermined path to a cracking station where the shell is gripped at both ends and, when cracked, is separated into two portions which are moved to inverted position to discharge or dump the egg contents therefrom, and wherein a single cracking mechanism is arranged at the cracking station which is operated in timed relation to the movement of the eggs.

It is another object of the invention to provide in an egg cracking machine an endless conveyor mechanism having a plurality of egg receiving suction cups thereon, a rotary frame at the leading end of the conveyor having a plurality of similar suction cups thereon which are arranged to cooperate with the suction cups on the conveyor mechanism whereby to grasp each egg at opposite ends with the cups on the conveyor mechanism and on the rotary frame moving into cooperating relation, in combination with a pair of pivotally mounted cracking knives which are arranged on opposite sides of the path of movement of the eggs, and mechanism for pivoting the knives to strike and break the shells of successive eggs as they are grasped by the cooperating suction cups, whereby the shells are divided into separate portions and the contents of each egg is discharged or dumped as the suction cups on the conveyor mechanism and the rotary frame advance in their respective paths and carry the shell portions in opposite directions.

It is another object of the invention to provide in an egg cracking machine of the type described a single cracking mechanism for successively breaking the shells of the eggs as they move into position at the cracking station and a cam controlled mechanism for operating the cracking knives in timed relation to the movement of the eggs to the cracking station.

It is a further object of the invention to provide in an egg cracking machine of the type described a cracking mechanism which comprises a retractable frame mounted adjacent the cracking station and having a cracking knife thereon which is adapted to be operated by a trip mechanism, with the frame adapted to initially position the knife in the path traversed by successive eggs as they move to the cracking station and to withdraw the same after each cracking operation to permit the contents of the cracked eggs to fall by gravity into successive receptacles positioned beneath the cracking station, the trip mechanism being released for the cracking operation by engagement of the eggs with a projecting portion of the frame.

It is another object of the invention to provide in an egg cracking machine of the type described a single cracking mechanism which is mounted at the cracking station and which comprises a cracking knife pivotally mounted on a movable carrying frame and hydraulically operated means for moving the carrying frame into and out of position for engaging the cracking knife in cracking relation with successive eggs as they are delivered to the cracking station.

These and other objects and advantages of the invention will be apparent from a consideration of the apparatus which is shown by way of illustration in the accompanying drawings, wherein:

Fig. 1 is a front elevation of a portion of an egg handling machine having a cracking mechanism embodying the principles of the present invention;

Fig. 2 is a plan view of the mechanism;

Fig. 3 is a section taken on the line 3—3 of Fig. 1;

Fig. 4 is a section taken on the line 4—4 of Fig. 1;

Fig. 5 is a fragmentary rear elevation;

Fig. 6 is a rear elevation of a portion of an egg handling machine having a modified form of cracking mechanism;

Fig. 7 is a section taken on line 7—7 of Fig. 6;

Fig. 8 is a fragmentary perspective view to an enlarged scale, showing the knife holder which forms part of the cracking mechanism;

Fig. 9 is a perspective view, to an enlarged scale, showing the cracking knife; and Fig. 10 is a partial front elevation showing the location of the cracking knife at the cracking station.

The embodiment of the invention which is shown in the drawings is particularly adapted for incorporation in an egg cracking machine of the general character wherein eggs are delivered on end to a series of suction cups, which cups are carried on a continuously traveling vertical conveyor to a cracking station, where the opposite end of each successive egg is gripped and held, during the cracking operation by a suction cup on a continuously rotating vertical turret. The turret rotates in timed relation to the egg carrying conveyor, with the egg shell being separated into two portions and the shell portions being carried away from the cracking station in divergent paths by advancing movement of the conveyor and the turret, the egg contents being dumped from the shell portions as they separate and being received in a receptacle on a horizontal conveyor which functions to separate the egg whites and egg yolks. In describing the present mechanism only those details of the conveyor, the suction cups for holding the eggs at the cracking station, the turret and the associated mechanism, which are necessary to understand the present device are described and illustrated herein.

The main frame or support for the machine comprises a vertically extending frame plate 10 (Figs. 1 to 5) having an aperture 11 through which an egg contents receiving and separating conveyor is adapted to move.

An egg carrying conveyor 12 is supported on the forward face of the frame plate 10 with one end traveling on an octagonal drum 13, which is rotatably mounted on the plate 10 for movement around the forwardly projecting supporting shaft or axle 14, and which is driven by the gear 15 on the opposite face of the plate 10. The gear 15 is suitably connected with a power drive mechanism (not shown).

The conveyor 12 comprises a series of chain forming pivotally connected links or plates 16, each of which carries an egg holding suction cup 17. The links 16 are pivotally connected at 18 to form the conveyor chain. Each link is apertured at 19 (Fig. 4) to receive a relatively short tubular section 20 on the outer end of which the suction cup 17 is secured. The conveyor carrying drum 13 is provided with a series of L-shaped passageways 21 which terminate on the peripheral faces 22 in the proper location for alignment with the apertures 19 in the chain plates 16 and connect the same to a suction box 23 which is secured in fixed relation on the supporting plate 10. The suction box 23 has a suitable port or passageway 24 which is connected with an external source of vacuum by the connection 25 and which is so arranged that suction is applied to the cups 17 as they move into position on the faces 22 of the drum 13 and travel around the same. The eggs 26 are received on end in the suction cups 17 from a suitable feed mechanism (not shown). As the conveyor 12 moves the cups 17 around the drum 13, the interior of each cup 17 is connected through the port 24 with the vacuum line which operates to hold the egg therein until it reaches the cracking position.

The other end of each egg is held at the cracking station by mechanism which includes a turret 27 which is arranged for rotation about a forwardly extending supporting shaft or axle 28 and which is driven by gear 29 and pinions 30 and 31, the latter connecting the gear 29 in driving relation with the driven gear 15. The turret 27 carries a series of egg holding suction cups 32. Each suction cup 32 is carried on the outer end of a tubular section 33 which is mounted in a relatively small rectangular support plate 34 and extends at its other end into the outer leg of an L-shaped air passageway 35 in the rotatable turret 27. The tubular section 33 is provided with an inner shoulder or head 36 which forms a seal for the passage of air through the passageway 35 when the passageway 35 is positioned with the inner end aligned with air passageway or port 37 in the suction box 38. Suction box 38 is secured to the frame plate 10, and the air port or passageway 37 is connected with a suitable source of vacuum by means of the external connections 39. The cups 32 are guided in their reciprocating movement relative to the turret 27 by a guide pin 40 secured on the support plate 34 and extending into a suitable aperture 40' in the turret 27. A locking ring 41 extends at one edge over the edge of the passageway 35 and provides a stop for engagement by the inner end of plate 34 and the head 36 to limit the movement of the cups 32 in each direction. The plates 34 extend outwardly beyond the outer face of the turret 27 a sufficient distance to permit engagement thereof by a cam roller 42 which is indicated on Fig. 1 and which is mounted for operation in proper timed relation to the movement of the turret 27, in a conventional manner so as to provide for positive movement of each successive cup 32 into opposed cooperating relation with a cup 17 on the conveyor 12 as the latter reaches the cracking station, thereby to engage and hold the opposite ends of the egg during the cracking operation.

A single mechanism 50 is provided for cracking the successive eggs as they reach the cracking station and are engaged at opposite ends by the suction cups 17 and 32. The cracking mechanism 50 comprises a pair of laterally spaced cracking knives or blades 51 and 52 which are pivotally mounted on pins 53 and 54, the latter being laterally spaced on a supporting bracket 55 which is secured to the frame plate 10 and projects forwardly of the face thereof above the cracking station. The cracking knives 51 and 52 are connected for simultaneous operation by a diagonally extending connecting bar 55 which is pivoted at 56 to the upper end of the knife 51 and at 57 on the knife 52 below the supporting pivot 54. The two knives 51 and 52 are urged towards each other by a tension spring 58 which is connected at 59 to the knife 51 and at 60 to the knife 52. The knives 51 and 52 are moved towards and from each other by a reciprocating bar 61 which is mounted for sliding relation in an upstanding bearing or guide block 62 secured on the bracket 55. The outer end 63 of the operating bar 61 is angled to extend into an elongate slot 64 in the upper end of the knife member 52. An adjustable stop pin 65 is supported in threaded relation in an upstanding bracket member 66 on the upper edge of the supporting bracket 55 and is provided with a lock nut 67 to secure it in the desired position where it will limit the movement of the breaking knife 52 towards the knife 51, the engagement of the end thereof with the upper end of the knife member 52.

The operating bar 61 is extended through aperture 68 in the frame plate 10 and supported at its other end on an apertured angle bracket 69 which extends upwardly of a rectangular frame 70, the latter being secured in rearwardly extending relation on the main frame plate 10. The rectangular frame 70 supports in suitable bearings a rearwardly extending shaft 71 which is rotatably driven by a gear 72 secured thereon and engaged in driving relation with the gear 15 of the main drive for the machine. The shaft 71 carries at its outer end a cylindrical cam 73 which is engaged by one end of a cam arm 74, the other end of the arm 74 being secured at 75 to the rear end of the cracking knife operating bar 61. The bar 61 is urged forwardly to hold the cam arm 74 in engagement with the cam track on the rearwardly facing flange of the cam 73 by a compression spring 76 which engages between angle bracket 69 and a stop collar 77 on the bar 61. A guide pin 78 on the arm 74 slides in a slot 79 in the bracket 69 and prevents rotation of the arm 74 and rod 61. The cam track on the cam 73 and the driving gear 72 are so arranged that they operate the bar 61 to move the cracking arms 51 and 52 towards each other for cracking each successive egg as it moves to the cracking station.

A pair of guide bars 80 and 81 are arranged generally parallel to the downwardly extending cracking arms 51 and 52. The bars 80 and 81 are pivotally mounted on the outer ends of the pins 53 and 54 and are connected for simultaneous movement by a bar 82 which is pivoted at 83 to the upper end of the guide bar 80 and at 84 to the guide bar 81 below the pivot 54. A tension spring 85 is connected at 86 to the arm 80 and at 87 to the diagonal connecting bar 82 to urge the guide bars 80 and 81 toward each other. The movement of the bars 80 and 81 is limited by a stop pin 88 mounted in adjustable threaded relation in a bracket 89 on the supporting bracket 55 and provided with a lock nut 90. The guide bars 80 and 81 tend to steady the movement of the eggs as they approach the cracking station for the operation of the cracking knives 51 and 52.

In operation the eggs are delivered on end to the suction cups 17 and are carried by the conveyor 12 around the supporting turret 13. As they move around the turret 13 the other end of each egg is gripped by one of the suction cups 32 on the turret 27. As each egg moves into the cracking position (Fig. 1) it is gripped at opposite ends by the cooperating suction cups 17 and 32, and held steady by the guide bars 80 and 81. The cracking knives 51 and 52 are operated by rotation of the cam 73 and resulting movement of the operating rod 61 to strike the egg on opposite sides sufficient to break the shell and permit it to separate upon advancing movement of the suction cups 17 and 32 on the conveyor 12 and turret 27, permitting the contents of the shell to drop by gravity into a receptacle 91 which has been moved into proper position beneath the cracking station.

A modified form of single cracking mechanism is illustrated in Figs. 6 to 10. This arrangement comprises a frame 100 which is mounted on a pair of pivot pins 101 supported in laterally spaced depending arms 102 which are mounted by means of bracket 103 on the rear face of vertical frame plate 104. The forward portion of the frame member 100 extends through the aperture 105 in the plate 104 which accommodates the conveyor carrying the separating cups (not shown). The frame 100 carries an air cylinder 106 through which there extends a piston forming shaft or rod member 107 with both ends of the member 107 projecting from the opposite ends of the cylinder 106 and with the member 107 carrying a piston member 108 which operates in the cylinder between two air connections 109 and 109' located at opposite ends of the cylinder 106. On the forward end the member 107 carries a generally U-shaped bent wire knife guard 110 which has its leg portions 111 bent at an angle and secured to a block 112 on the end of the member 107 so that the body of the guard member 110 projects forwardly into the path of the eggs as they move to the cracking station, when the member 107 is extended in the forward direction as in Fig. 7. The knife guard 110 provides a horizontally extending slot 113 in which there is mounted the knife edge portion 114 of a blade member 115 which is pivoted at 116 to triangular web portions 117 which are secured at the angle of the leg members. The blade 115 is pivoted at 116 so that cracking edge 114 may be moved from a withdrawn position within the recess 113 to a projecting position above the guard 110 by swinging the blade about the pivot 116. This is accomplished at the proper time by engagement with plate or abutment member 118, on the rearwardly directed edge of the pivoted blade 115, of a striker or plunger rod member 119. The operating or plunger rod member 119 is carried in slidable relation on the supporting frame 100 beneath the air cylinder 106. The plunger rod 119 is provided with a peripheral groove 120 which is adapted to receive the end of a trip lever 121 when in the cocked position as in Fig. 7. The plunger rod 119 is provided at its forward end with a compression spring 122 which is confined between the head 123 of the rod and the frame member 124 and which is adapted to project the shaft forwardly for engaging the head 123 with the plate 118 on the blade 115 to perform the cracking operation when the plunger rod 119 is released. The plunger rod 119 is carried to its retracted or cocked position by movement of the piston rod member 107, in a manner which will be described. The operating or trip lever 121 is pivoted adjacent one end at 125, on the frame 100. At the other end the lever 121 is confined between two rearwardly extending, vertically spaced, studs 126 and 127. A tension spring 128 is connected at 129 to the frame 100 and at 130 to the lever 121 and tends to urge the end of the lever 121 adjacent the pivot 125 into engagement with the plunger rod 119. The plunger rod 119 is held in alignment with the piston member 107 by means of the depending bracket 131 which is pinned at 132 to the member 107 and provided with an aperture 133 for receiving the end of the plunger rod 119 in sliding relation therein. Air is supplied to the cylinder 106 by means of an external source and controlled through a valve arrangement 134 which is mounted on a U-shaped or rectangular frame 135 secured on the rear side of the plate 104 and supporting a shaft 136 which is connected in driving relation with the main driving gear 137 by a pinion 138 and which carries a pair of cam plates 139 and 140 adapted to operate the valve mechanism 134 to supply air to the cylinder 106 through the air lines indicated at 141 and 142. The valve mechanism 134 is operated by the cams 139 and 140 to position the piston rod member 107 in extended relation just prior to the approach of each successive egg to the cracking position where the egg will engage the wire knife guard 110 and pivot the frame 100 sufficient to swing the lever 121 in a counterclockwise movement about the pivot 125 and release the plunger rod 119 which is projected forwardly by force of the spring 122 until the head 123 strikes the plate 118 on the pivoted blade holder 115 and raises the cracking knife edge 114 a sufficient distance above the guard 110 to crack the egg. The piston rod member 107 is immediately retracted by operation of the valve mechanism 134 and the plunger rod 119 is moved to a cocked position by retraction of the piston rod member 107 to permit the cracked egg to move away from the cracking station. The cycle of operation of the cracking knife is repeated for each successive egg as it moves up to the cracking station, the egg engaging the frame 100 and tilting the same sufficiently to trip the lever 121 and release the plunger rod 119 for the cracking operation.

While specific details of construction have been referred to in describing the illustrated mechanism it will be understood that other details of construction may be resorted to within the spirit of the invention.

I claim:

1. An egg handling machine comprising a vertical support plate, a pair of carrier members rotatably mounted in spaced relation on said support plate, a series of egg gripping suction cups associated with each of said carrier members, means to rotate said carrier members in timed relation to advance the suction cups into cooperating opposed egg gripping relation between said turret members, a supporting bracket extending from one side of said support plate above said carrier members, a pair of shell cracking blades mounted on spaced pivots on said bracket and depending in spaced relation on opposite sides of said eggs when said eggs are positioned between said carrier members, means resiliently urging said blades about said pivots and toward each other, a reciprocably mounted operating member on said support plate having at one end a pivot and slot connection with one of said blades, means to reciprocate said operating member in timed relation to the movement of said carrier members and an adjustable stop means to limit the movement of said blades toward each other.

2. An egg handling machine comprising a vertical supporting frame member, a pair of carrier members rotatably mounted in spaced relation on said frame member, a series of egg gripping suction cups associated with each of said carrier members, means connected to said carrier members to rotate said carrier members in timed relation to advance the suction cups into opposed relation between said carrier members for gripping opposite ends of successive eggs, a supporting bracket extending from one side of said frame member above said carrier members, a pair of shell cracking blades pivotally mounted at their upper ends on said bracket and depending in spaced relation on opposite sides of said suction cups when said eggs are positioned between said carrier members, means connecting said blades for simultaneous movement toward and from each other, an operating rod extending laterally of said frame member and having one end pivotally and slidably connected with the upper end of one of said blades, means operable on the other end of said operating rod to reciprocate the same in timed relation to the movement of said carrier members whereby to crack the successive eggs, and an adjustable stop member engageable with one of said blades to limit the movement of said blades toward each other.

3. An egg handling machine comprising a vertical support plate, a pair of carrier members rotatably mounted in spaced relation on said support plate, a series of egg gripping suction cups associated with each of said carrier members, means to rotate said carrier members in timed relation to advance the suction cups into cooperating opposed relation between said carrier members for gripping opposite ends of successive eggs, a supporting bracket extending from one side of said support plate above said carrier members, a pair of shell cracking blades pivotally mounted on said bracket and depending in spaced relation on opposite sides of said suction cups as said eggs are gripped by the suction cups between said carrier members, means connecting said blades for simultaneous movement toward and from each other, an operating rod extending laterally of said support plate, one end of said rod being connected with one of said blades, a cam arm on the other end of said rod, and a cam supported on said support plate and engageable with said cam arm for reciprocating said rod in timed relation to the movement of said carrier members whereby to engage each successive egg with said blades.

4. An egg handling machine comprising a vertical support plate, a pair of carrier members rotatably mounted in spaced relation on said support plate, a series of egg gripping suction cups associated with each of said carrier members, means to rotate said carrier members in timed relation to advance the suction cups into cooperating opposed relation between said carrier members for gripping opposite ends of successive eggs, a supporting bracket extending from one side of said support plate above said carrier members, a pair of egg guiding members pivotally mounted on said bracket and depending between said carrier members in the path of movement of eggs carried by said suction cups, said guiding members being resiliently urged toward each other, a pair of shell cracking blades pivotally mounted on said bracket and depending in spaced relation on opposite sides of the path traversed by said suction cups as they advance between said carrier members, means resiliently urging said shell cracking blades toward each other, an operating rod extending laterally of said support plate and having one end connected with one of said blades, and means to reciprocate said rod in timed relation to the movement of said carrier members.

5. An egg handling machine comprising a vertical support plate, a pair of conveyor members rotatably mounted in spaced relation on said support plate, a series of egg gripping cups associated with each of said conveyor members, means to rotate said conveyor members continuously in timed relation to advance the cups into cooperating opposed egg gripping relation at a cracking station between said conveyor members, a supporting bracket extending from one side of said support plate above said conveyor members, a pair of shell cracking blades mounted on spaced pivots on said bracket and depending in spaced relation on opposite sides of said eggs between said conveyor members, means resiliently urging said blades toward each other, a reciprocably mounted operating member on said support plate having one end connected with one of said blades, and a rotatable cam at the other end of said operating member for reciprocating said operating member intermittently in timed relation to the movement of said conveyor members and an adjustable stop means to limit the movement of said blades relative to each other.

6. An egg handling machine comprising a vertical supporting frame member, a pair of conveyor members rotatably mounted in spaced relation on said frame member, a series of egg gripping cups associated with each of said conveyor members, means to rotate said conveyor members continuously in timed relation to advance the cups into opposed relation between said conveyor members for gripping opposite ends of successive eggs, a supporting bracket extending from one side of said frame member adjacent said conveyor members, a pair of shell cracking blades pivotally mounted at their ends on said bracket and extending in spaced relation on opposite sides of said cups when said eggs are positioned between said conveyor members, means connecting said blades for simultaneous movement toward and from each other, an operating rod extending laterally of said frame member and having a pivot member at one end connected with the end of one of said blades, a cam associated with the other end of said operating rod for reciprocating the same at regular intervals in timed relation to the movement of said conveyor members whereby to crack the successive eggs.

7. An egg handling machine comprising a vertical support plate, a pair of conveyor members rotatably mounted in spaced relation on said support plate, a series of egg gripping cups associated with each of said conveyor members, means to rotate said conveyor members continuously in timed relation to advance the cups into cooperating opposed relation between said turret members for gripping opposite ends of successive eggs, a supporting bracket extending from one side of said support plate above said conveyor members, a pair of shell cracking blades pivotally mounted on said bracket and depending in spaced relation on opposite sides of said cups as said eggs are gripped at their opposite ends between said conveyor members, a link member connecting said blades for simultaneous movement toward and from each other, an operating rod extending laterally of said support plate, one end of said rod having a connection with one of said blades, a cam arm on the other end of said rod, and a cam engageable with said cam arm for reciprocating said rod intermittently in timed relation to the movement of said conveyors whereby to engage said blades with successive eggs.

8. An egg handling machine comprising a vertical support plate, a pair of conveyor members rotatably mounted in spaced relation on said support plate, a series of egg gripping cups associated with each of said conveyor members, means to rotate said conveyor members continuously in timed relation to advance the cups into cooperating opposed relation between said conveyor members for gripping opposite ends of successive eggs, a supporting bracket extending from one side of said support plate above said conveyor members, a pair of egg guiding members pivotally mounted on said bracket and depending into the path traversed by said cups, said guiding members being resiliently urged toward each other, a pair of shell cracking blades pivotally mounted on said bracket and depending in spaced relation on opposite sides of the path of said cups as they advance between said turret members, means resiliently urging said shell cracking blades toward each other, an operating rod extending laterally of said support plate and having one end connected with one of said blades, and a continuously rotating cam operative on said operating rod to reciprocate the same in timed relation to the movement of said conveyor members.

9. An egg handling machine comprising a vertical support plate, a pair of conveyor members rotatably mounted in spaced relation on said support plate, a series of egg gripping devices associated with each of said conveyor members, means to rotate said conveyor members continuously in timed relation to advance the gripping devices into cooperating opposed relation between said conveyor members for gripping opposite ends of successive eggs, a supporting bracket extending from one side of said support plate above said conveyor members, and a pair of egg guiding and centering members pivotally mounted on said bracket and depending into the path traversed by the eggs carried by said gripping devices, which guiding members are resiliently urged toward each other.

10. An egg handling machine comprising a fixed supporting frame, a pair of spaced carrier members rotatably mounted on said frame, each of said carrier members having a series of shell gripping members supported thereon for movement in the same plane, means connected to said carrier members for rotating said carrier members continuously in timed relation to bring successive gripping members thereon into opposed cooperating shell gripping relation at a cracking station with opposite ends of eggs delivered to the gripping members of one of said carrier members, and an egg cracking device mounted on said supporting frame adjacent said cracking station and in spaced relation to said shell gripping members, said egg cracking device comprising a cracking blade, means for mounting said blade on said frame for movement between said gripping members in a plane which is substantially normal to the plane of operation of said carrier members and into cracking engagement with the successive eggs at said cracking station, and operating means connected to said blade to automatically move said blade toward said cracking station intermittently in timed relation to the movement of said carrier members to engage and crack the shell of each successive egg as it moves between said carrier members.

11. An egg handling machine comprising a fixed supporting frame, a pair of spaced carrier members rotatably mounted on said supporting frame, each of said carrier members having a series of shell gripping members supported thereon for movement in the same plane, means connected to said carrier members for rotating said carrier members continuously in timed relation to bring successive gripping members thereon into opposed cooperating gripping relation at a cracking station with opposite ends of eggs delivered to the gripping members of one of said carrier members, and an egg cracking device mounted on said supporting frame adjacent said cracking station and in spaced relation to said gripping members, said cracking device comprising a blade mounted on a pivot which is located on said supporting frame to position said blade for movement between said gripping members in a plane generally transverse of the plane of movement of said carrier members and into the path of the successive eggs, and drive means connected to said blade including a cam on said supporting frame which is operative to pivot said blade toward said cracking station intermittently in timed relation to the movement of said carrier members to engage and crack the shell of each successive egg as it advances between said carrier members.

12. An egg handling machine comprising a fixed supporting frame, a pair of spaced carrier members rotatably mounted on said supporting frame, each of said carrier members having a series of shell gripping members supported thereon for movement in the same plane, means connected to said carrier members for rotating said carrier members continuously in timed relation to bring successive gripping members thereon into opposed cooperating gripping relation at a cracking station with opposite ends of eggs delivered to the gripping members of one of said carrier members, and a shell cracking device mounted on said supporting frame in spaced relation to said gripping members, said cracking device having a blade pivotally mounted on said frame for movement between said gripping members in a plane substantially transverse of the plane of movement of said gripping members, and reciprocable means mounted on said supporting frame in spaced relation to said carrier members to intermittently pivot said blade in timed relation to the movement of said carrier members to engage and crack the shell of each successive egg as it passes between said carrier members.

13. An egg handling machine comprising a fixed supporting frame, a pair of spaced carrier members rotatably mounted on said frame, each of said carrier members having a series of shell gripping members supported thereon for movement in the same plane, means connected to said carrier members for rotating said carrier members continuously in timed relation to bring successive gripping members thereon into opposed cooperating shell gripping relation at a cracking station with opposite ends of eggs delivered to the gripping members of one of said carrier members, and an egg cracking device mounted on said supporting frame adjacent said cracking station and in spaced relation to said shell gripping members, said egg cracking device comprising a pair of cracking blades, pivot means for mounting said cracking blades on said frame for movement between said gripping members in a plane which is substantially normal to the plane of operation of said carrier members and into cracking engagement with the successive eggs at said cracking station, and operating means connected to said blades to swing said blades toward said cracking station intermittently and in timed relation to the movement of said carrier members to engage and crack the shell of each successive egg as it moves between said carrier members.

References Cited in the file of this patent

UNITED STATES PATENTS

| | | |
|---|---|---|
| 1,397,306 | White | Nov. 15, 1921 |
| 1,945,788 | Pilley | Feb. 6, 1934 |
| 2,090,963 | Reese | Aug. 24, 1937 |
| 2,443,188 | Hodson | June 15, 1948 |
| 2,500,648 | Sunseri | Mar. 14, 1950 |
| 2,670,674 | Whitsel | Mar. 2, 1954 |